United States Patent
Chen

(10) Patent No.: US 8,736,711 B2
(45) Date of Patent: May 27, 2014

(54) CAMERA WITH ANTI-FLICKER CAPABILITY AND IMAGE CAPTURING METHOD WITH ANTI-FLICKER CAPABILITY

(75) Inventor: Jau-Yu Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 232 days.

(21) Appl. No.: 13/486,604

(22) Filed: Jun. 1, 2012

(65) Prior Publication Data

US 2013/0242143 A1    Sep. 19, 2013

Related U.S. Application Data

(60) Provisional application No. 61/612,816, filed on Mar. 19, 2012.

(51) Int. Cl.
*H04N 9/73* (2006.01)
*G06K 9/40* (2006.01)

(52) U.S. Cl.
USPC ............... 348/228.1; 348/226.1; 348/227.1; 382/254; 382/274; 382/275

(58) Field of Classification Search
USPC ....................................................... 348/228.1
See application file for complete search history.

(56) References Cited

U.S. PATENT DOCUMENTS

| | | | |
|---|---|---|---|
| 8,648,929 B2* | 2/2014 | Ho et al. ..................... | 348/226.1 |
| 2006/0055823 A1* | 3/2006 | Kinoshita et al. ............ | 348/511 |
| 2009/0040374 A1* | 2/2009 | Kobayashi .................. | 348/448 |
| 2010/0123810 A1* | 5/2010 | Greenland et al. ........... | 348/294 |
| 2011/0255786 A1* | 10/2011 | Hunter ......................... | 382/190 |
| 2012/0154628 A1* | 6/2012 | Horiuchi .................... | 348/226.1 |
| 2012/0154629 A1* | 6/2012 | Horiuchi .................... | 348/226.1 |

* cited by examiner

*Primary Examiner* — Michael Osinski
*Assistant Examiner* — Quan Pham
(74) *Attorney, Agent, or Firm* — Birch, Stewart, Kolasch & Birch, LLP

(57) ABSTRACT

A camera and an image capturing method with anti-flicker capability. The camera has a camera sensor and an image signal processor. The camera sensor captures first and second image data separated by a time delay which depends on a flicker period of background illumination. The image signal processor differentiates the first and the second image data along rows to obtain first and second differentiated image data, respectively, normalizes the first and second image data to obtain for each column an oscillation amplitude, normalizes the first and second differentiated image data to obtain for each column an oscillation amplitude, and obtains flicker-eliminated image data based on the first and second image data, the first and second differentiated image data, and the oscillation amplitudes obtained from normalizing the first and second image data and the oscillation amplitudes obtained from normalizing the first and second differentiated image data.

16 Claims, 7 Drawing Sheets

CAMERA WITH ANTI-FLICKER CAPABILITY AND IMAGE CAPTURING METHOD WITH ANTI-FLICKER CAPABILITY

CROSS REFERENCE TO RELATED APPLICATIONS

This application claims the benefit of U.S. Provisional Application No. 61/612,816 filed Mar. 19, 2012, the entirety of which is incorporated by reference herein.

BACKGROUND OF THE INVENTION

1. Field of the Invention

The present invention relates to cameras and image capturing methods, and particularly relates to an anti-flicker function to solve the flicker problem due to oscillated background illumination.

2. Description of the Related Art

To capture images by a camera, the background illumination may affect the captured images. Considering an environment with indoor lighting, dark and bright lines may be interlaced over an entire image captured by a camera because the power source of the background illumination may oscillate frequently (due to an AC power source). To solve the flicker problem of the captured image, anti-flicker technologies are required.

In conventional anti-flicker techniques, the exposure time for each line of an image is an integer multiple of the flicker period of the background illumination. FIG. 1A depicts a rolling shutter operation for a sensor array (e.g. CCD or CMOS array) and shows the oscillation of the background illumination. In the rolling shutter mode, the rows of the sensor array are exposed in turn rather than being exposed altogether for a snapshot of a single point of time. As shown, the exposure time for each row is 1/fbi second—the same as the flicker period of the background illumination. For every row, the integrated value of background illumination is constant. For example, the integrated value 102 of background illumination collected during the exposure of the $k^{th}$ row equals the integrated value 104 of background illumination collected during the exposure of the $l^{th}$ row. Thus, the flicker problem is solved.

However, for high-brightness background illumination, the exposure time for each row has to be cut even shorter than the flicker period (1/fbi sec) of the background illumination. FIG. 1B shows the integrated value of background illumination not being constant for every row when the exposure time for each row is reduced to half the flicker period of the background illumination—1/(2fbi) sec. For example, the integrated value 106 of background illumination collected during the exposure of the $k^{th}$ row is much more than the integrated value 108 of background illumination collected during the exposure of the $l^{th}$ row. The flicker from the background illumination is still visible in the captured image.

Thus, an anti-flicker technique which is free from the restraint of the exposure time is called for, especially for high-brightness background illumination.

BRIEF SUMMARY OF THE INVENTION

Cameras and image capturing methods with anti-flicker capability are disclosed.

A camera in accordance with an exemplary embodiment of the disclosure comprises a camera sensor and an image signal processor. The camera sensor captures first and second image data which are separated by a time delay. The time delay depends on a flicker period of background illumination. The image signal processor differentiates the first and the second image data along rows to obtain first and second differentiated image data, respectively. Further, the image signal processor normalizes the first and second image data and thereby obtains for each column an oscillation amplitude, and normalizes the first and second differentiated image data and thereby obtains for each column an oscillation amplitude. Based on the first and second image data, the first and second differentiated image data, and the oscillation amplitudes obtained from normalizing the first and second image data and the oscillation amplitudes obtained from normalizing the first and second differentiated image data, the image signal processor eliminates the flicker due to the background illumination and thereby flicker-eliminated image data is obtained.

An image capturing method in accordance with an exemplary embodiment of the invention comprises the steps below: capturing first and second image data which are separated by a time delay, wherein the time delay depends on a flicker period of background illumination; differentiating the first and the second image data along rows to obtain first and second differentiated image data, respectively; normalizing the first and second image data and thereby obtaining for each column an oscillation amplitude; normalizing the first and second differentiated image data and thereby obtaining for each column an oscillation amplitude; and eliminating flicker of background illumination to obtain flicker-eliminated image data based on the first and second image data, the first and second differentiated image data, and the oscillation amplitudes obtained from normalizing the first and second image data and the oscillation amplitudes obtained from normalizing the first and second differentiated image data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1A:
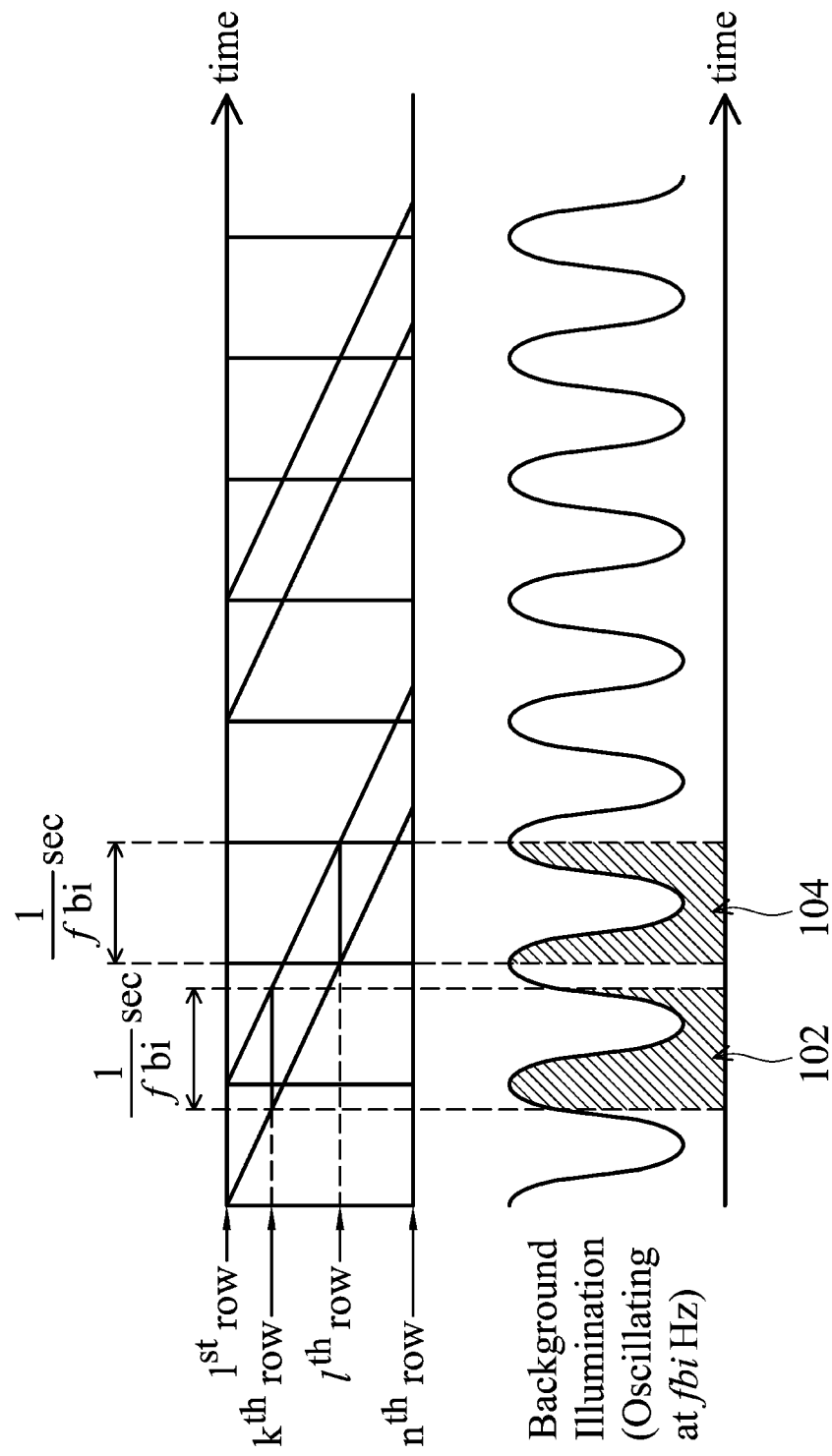
FIG. 1A depicts a rolling shutter operation for a sensor array (e.g. CCD or CMOS array) and shows the oscillation of the background illumination.
Figure 1B:
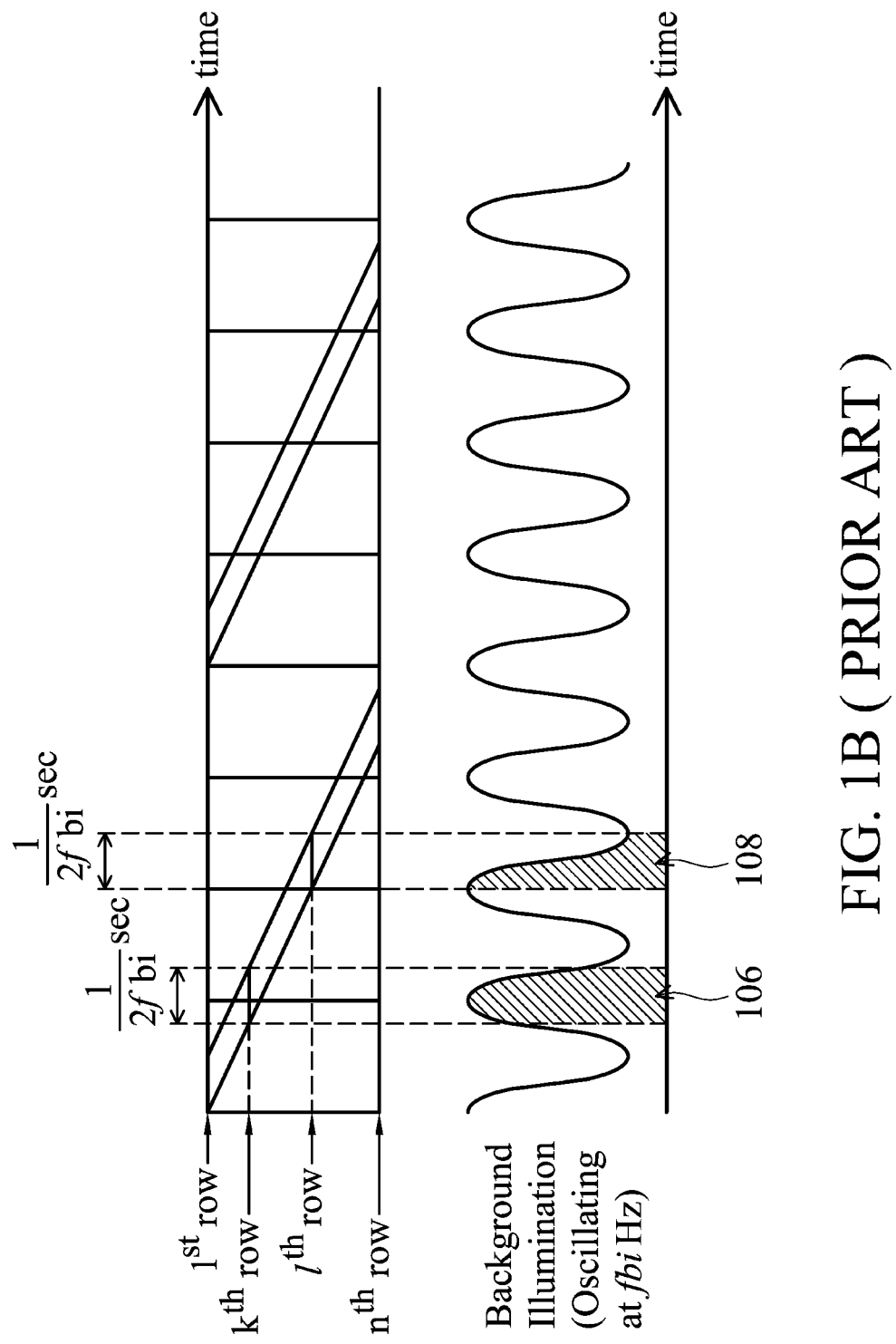
FIG. 1B shows the integrated value of background illumination not being constant for every row when the exposure time for each row is reduced to half the flicker period of the background illumination—1/(2fbi) sec.
Figure 2:
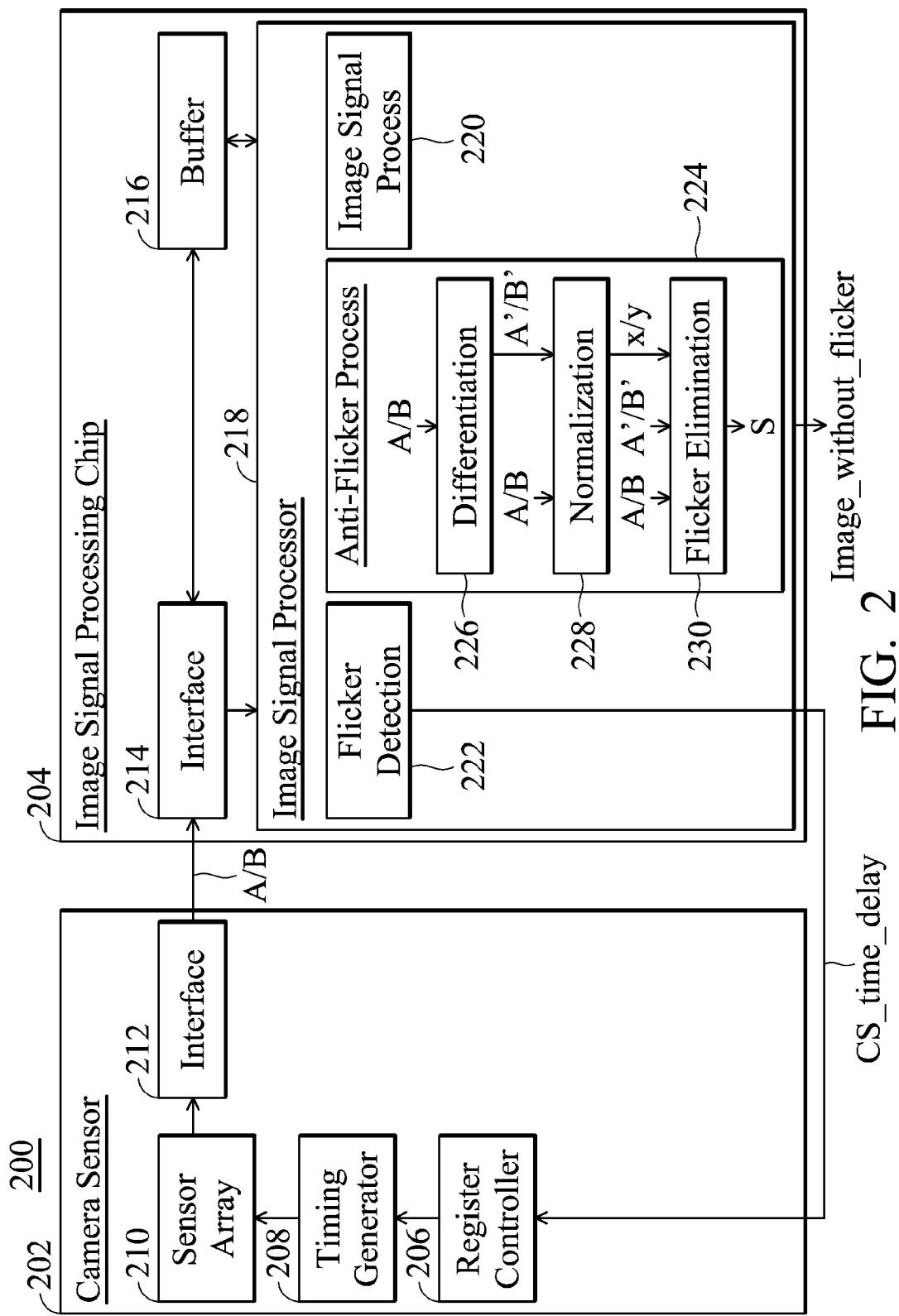
FIG. 2 shows a camera 200 in accordance with an exemplary embodiment of the invention.

FIG. 2 shows a camera 200 in accordance with an exemplary embodiment of the invention, which comprises a camera sensor 202 and an image signal processing chip 204.

The camera sensor 202 may comprise a register controller 206, a timing generator 208, a sensor array 210 and an interface 212. According to a time delay control signal CS_time_delay dependent on a flicker period of background illumination, the register controller 206 controls the timing generator 208 to scan the sensor array 210 twice to obtain first image data A and second image data B to be output through the interface 212. Accordingly, there is a time delay—controlled by the time delay control signal CS_time_delay and dependent on the flicker period of the background illumination—between the first and second image data A and B.

The image signal processing chip 204 may comprise an interface 214, a buffer 216 and an image signal processor 218. The image signal processing chip 204 receives the first image data A and the second image data B though the interface 214. The buffer 216 is operative to buffer the first image data A (which is captured prior to the second image data B). The image signal processor 218, coupled to the interface 214 and the buffer 216, receives the first image data A and the second image data B.

The image signal processor 218 is discussed next.

In addition to an image signal process 220 which may involve conventional image processing procedures such as a luma/chroma process, the image signal processor 218 further provides flicker detection 222 and an anti-flicker process 224 for the flicker problem.

The flicker detection 222 is operative to detect a flicker due to background illumination and thereby obtain a flicker period (or a flicker frequency) of the background illumination. The time delay control signal CS_time_delay controlling the time delay between the first and second image data A and B is set in accordance with the detection result of the flicker detection 222.

The anti-flicker process 224 includes a differentiation procedure 226, a normalization procedure 228 and a flicker elimination procedure 230. By the differentiation procedure 226, the first and the second image data A and B are differentiated along rows and thereby first and second differentiated image data A' and B' are obtained, respectively. By the normalization procedure 228, the first and second image data A and B are normalized, wherein, for different columns of the first/second image data A/B, oscillation amplitudes (e.g., represented by x, a vector indexed by column number) are obtained. Further, the first and second differentiated image data A' and B' are normalized by the normalization procedure 228, wherein, for different columns of the first/second differentiated image data A'/B', oscillation amplitudes (e.g., represented by y, a vector indexed by column number) are obtained. By the flicker elimination procedure 230, flicker-eliminated image data S is obtained based on the first and second image data A and B, the first and second differentiated image data A' and B', and the oscillation amplitudes (represented by x) obtained from normalizing the first and second image data A and B and the oscillation amplitudes (represented by y) obtained from normalizing the first and second differentiated image data A' and B'. In some exemplary embodiments, an image Image_without_flicker may be generated from the flicker-eliminated image data S with the execution of the image signal process 220.

Note that the blocks shown in FIG. 2 are not intended to limit the implementation of the disclosure. In the embodiment shown in FIG. 2, the image signal processor 218 is implemented within an ASIC (i.e., the image signal processing chip 204) separated from the camera sensor 202 and the image signal processing chip 204 and the camera sensor 202 communicate through their respective interfaces 212 and 214. However, in other exemplary embodiments, the image signal processor of the disclosure (which provides the aforementioned operations such as flicker detection, differentiation, normalization, and flicker elimination) may be incorporated with a camera sensor (e.g. a CCD or CMOS array) by an SoC design. Or, the image signal processor of the disclosure may be implemented by a microcontroller which executes a firmware. Or, the image signal processor of the disclosure may be implemented by a computer which executes software programs.

Figure 3:
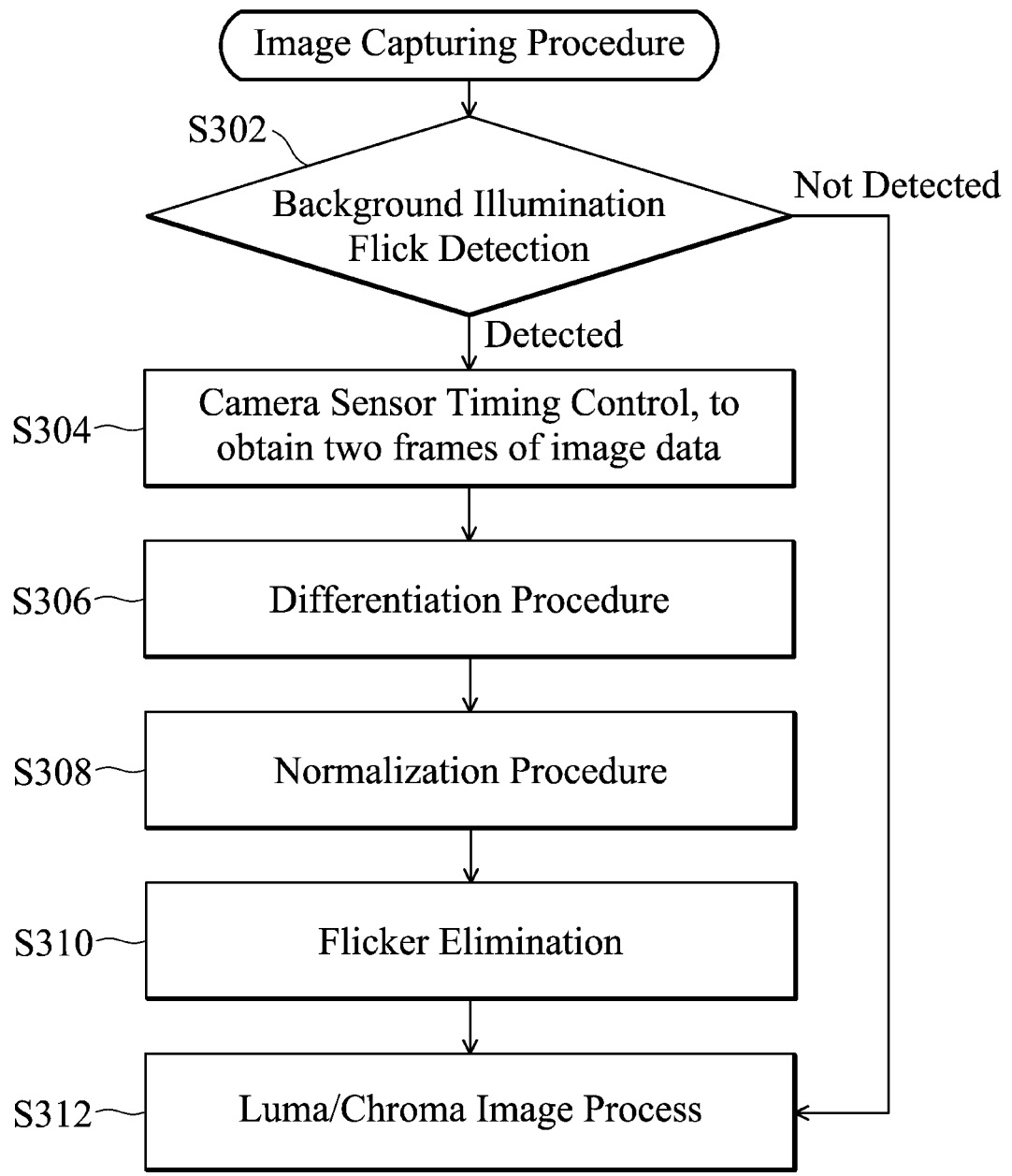
FIG. 3 is a flowchart depicting an image capturing procedure in accordance with an exemplary embodiment of the invention.

FIG. 3 is a flowchart depicting an image capturing procedure in accordance with an exemplary embodiment of the invention. In step S302, flicker detection is performed to determine whether the background illumination is oscillating at a particular flicker frequency (or according to a particular flicker period.) When it is determined that the background illumination is oscillating, step S304 is executed for the camera sensor timing control process, by which the controlled camera sensor captures first image data and second image data separated by a time delay dependent on the flicker period of the background illumination. The steps S306, S308 and S310 correspond to the anti-flicker process 224 introduced in FIG. 2. In the steps S308 to S310, the first and second image data are processed by the aforementioned differentiation, normalization and the flicker elimination processes. After the flicker elimination of step S310, step S312 is performed, by which conventional image signal processing procedures such as luma and chroma image processes are performed. Conversely, when it is determined in step S302 that the background illumination is stable without flicker problems, steps S304 to S310 are bypassed and the procedure proceeds to the step S312 for conventional image signal processing.

Figure 4:
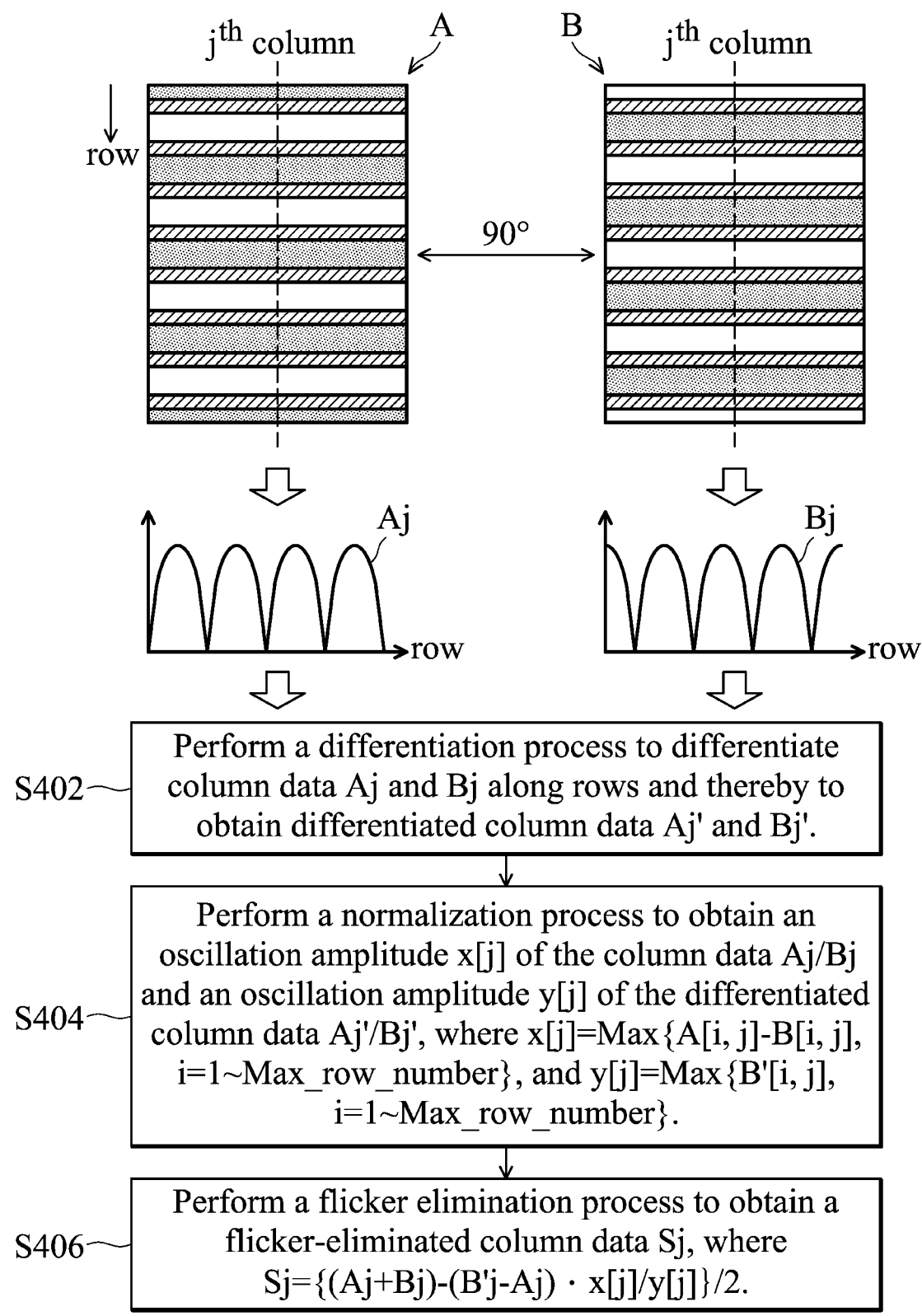
FIG. 4 shows how the disclosed anti-flicker process is operated on the first image data A and the second image data B to generate the flicker-eliminated image data S.

FIG. 4 shows how the disclosed anti-flicker process is operated on the first image data A and the second image data B to generate the flicker-eliminated image data S, wherein the time delay between the first and second image data A and B is half the flicker period of the background illumination (i.e., there is a phase difference of 90° between the first and second image data A and B.) For simplicity, the discussion focuses on the data of the $j^{th}$ column. For the first image data A, a vector Aj represents the data of the $j^{th}$ column. For the second image data B, a vector Bj represents the data of the $j^{th}$ column.

In step S402, a differentiation process is performed and thereby column data Aj and Bj are differentiated along rows and differentiated column data Aj' and Bj' are obtained.

In step S404, a normalization process is performed and thereby an oscillation amplitude x[j] of the column data Aj/Bj and an oscillation amplitude y[j] of the differentiated column data Aj'/Bj' may be obtained by the following equations:

$$x[j]=\text{Max}\{A[i,j]-B[i,j],\ i=1\sim\text{Max\_row\_number}\},$$

and $$y[j]=\text{Max}\{B'[i,j],\ i=1\sim\text{Max\_row\_number}\},$$

where:
 A[i, j] represents pixel data of the ith row and the jth column of the first image data A;
 B[i, j] represents pixel data of the ith row and the jth column of the second image data B;
 B'[i, j] represents pixel data of the ith row and the jth column of the second differentiated image data B'; and
 Max_row_number shows the total number of rows.

In step S406, a flicker elimination process is performed and thereby a flicker-eliminated column data Sj may be obtained by the following equation:

$$Sj=\{(Aj+Bj)-(B'j-A'j)\cdot x[j]/y[j]\}/2.$$

In conclusion, a calculation for pixel data S[i, j] is proposed for the generation of the flicker-eliminated image data S, where:

$$S=S[i,j],\ I=1\text{~Max\_row\_number and}$$
$$j=1\text{~Max\_column\_number,}$$

$$S[i,j]=\{(A[i,j]+B[i,j])-(B'[i,j]-A'[i,j])\cdot x[j]/y[j]\}/2,$$

Where Max_column_number shows the total number of columns.

Figure 5:
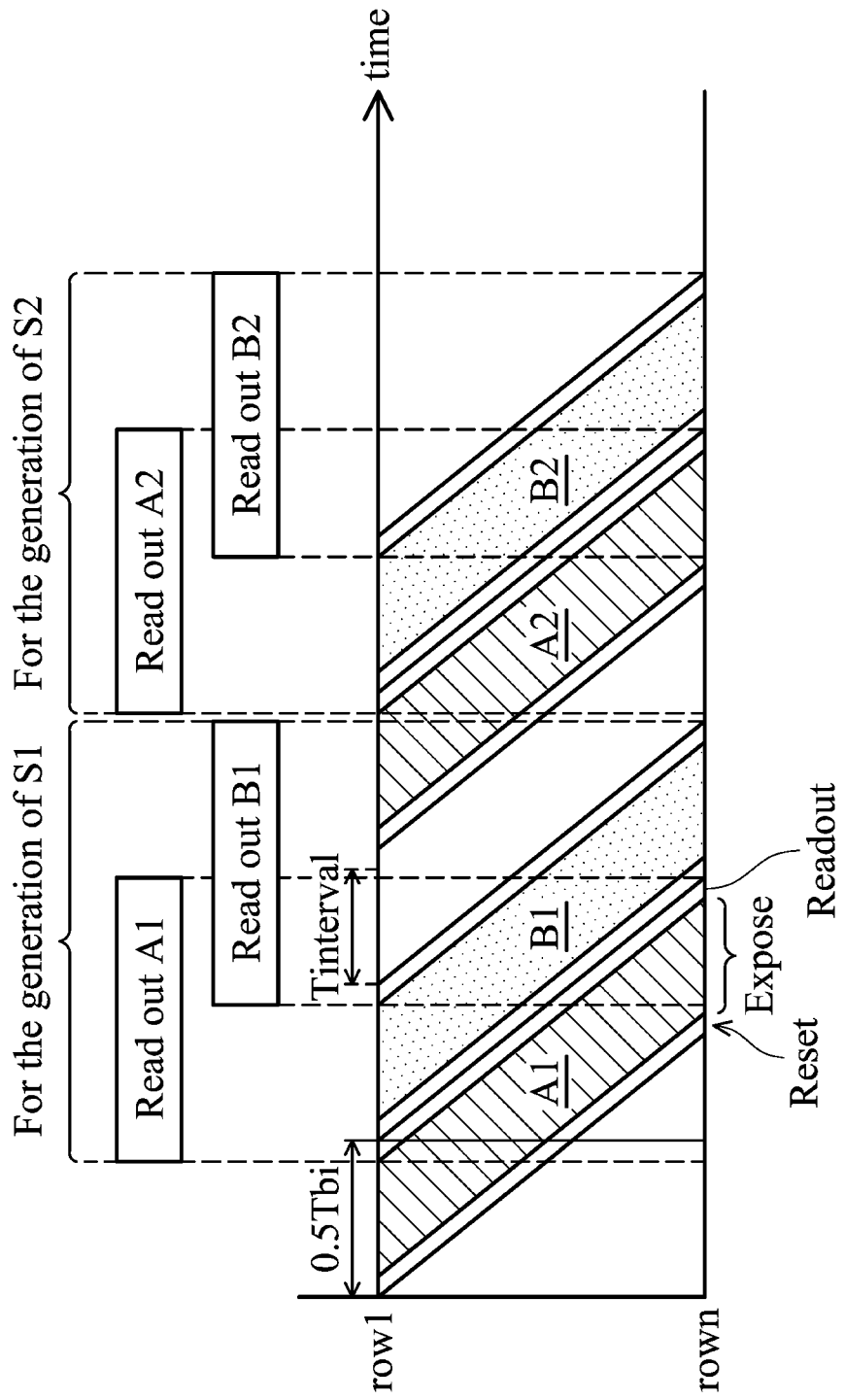
FIG. 5 and FIG. 6 show two timing control schemes for the camera sensor in accordance with exemplary embodiments of the invention.
Figure 6:
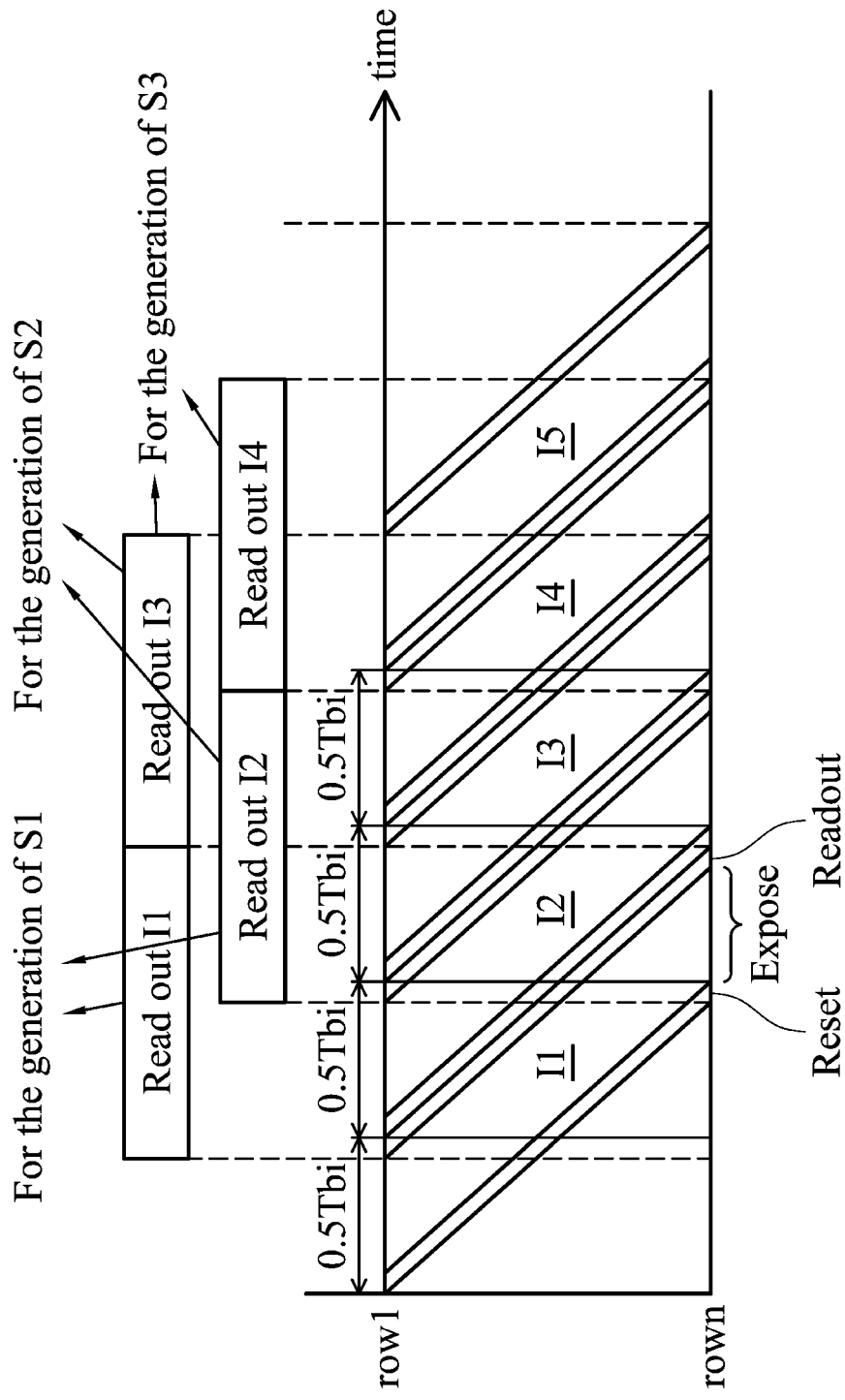

FIG. 5 and FIG. 6 show two timing control schemes for the camera sensor in accordance with exemplary embodiments of the invention.

In FIG. 5, there is a time delay 0.5 Tbi (half the flicker period of the background illumination) between the image data A1 and the image data B1. Based on the image data A1 and B1, flicker-eliminated image data S1 is generated. Further, the camera sensor captures another two frames of image data A2 and B2 to generate subsequent flicker-eliminated image data S2. The image data A2 and the image data B2 are separated by the time delay 0.5 Tbi (the same as that between A1 and B1), and, the capturing of the image data A2 is separated from the capturing of the image data B1 by a time interval Tinterval. In this embodiment, the time interval Tinterval is specially designed, to be long enough to separate the readout process of A2 from the readout process of B1. As shown, the camera sensor starts the exposure process for capturing the image data A2 when the image data B1 has been completely read out. In this manner, only the previous frame (A1 or A2) required in the generation of a flicker-eliminated image data is considered in the buffer design.

In FIG. 6, frames of image data are captured in sequence (as indicated by I1 to I5) without being separated by the time interval Tinterval introduced in FIG. 5. There is a time delay 0.5 Tbi (half the flicker period of the background illumination) between the image data I1 and the image data I2. Based on the image data I1 and I2, flicker-eliminated image data S1 is generated. Similarly, there is a same time delay 0.5 Tbi between the image data I2 and the image data I3. Based on the image data I2 and I3, flicker-eliminated image data S2 is generated. Further, there is a same time delay 0.5 Tbi between the image data I3 and the image data I4. Based on the image data I3 and I4, flicker-eliminated image data S3 is generated. Compared to that shown in FIG. 5, a larger buffer size may be required in FIG. 6.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera with anti-flicker capability, comprising:
a camera sensor, capturing first and second image data which are separated by a time delay, wherein the time delay depends on a flicker period of background illumination; and
an image signal processor, differentiating the first and the second image data along rows to obtain first and second differentiated image data, respectively, normalizing the first and second image data and thereby obtaining for each column an oscillation amplitude, normalizing the first and second differentiated image data and thereby obtaining for each column an oscillation amplitude, and eliminating flicker of background illumination to obtain flicker-eliminated image data based on the first and second image data, the first and second differentiated image data, and the oscillation amplitudes obtained from normalizing the first and second image data and the oscillation amplitudes obtained from normalizing the first and second differentiated image data.

2. The camera as claimed in claim 1, wherein the time delay is half the flicker period of the background illumination.

3. The camera as claimed in claim 1, wherein the image signal processor normalizes the first and second image data based on the following formula:

$$x[j]=\text{Max}\{A[i,j]-B[i,j],\ i=1\text{~Max\_row\_number}\},$$

where:
x[j] represents the oscillation amplitude of a jth column of the first/second image data;
A[i, j] represents pixel data of an ith row and the jth column of the first image data;
B[i, j] represents pixel data of an ith row and the jth column of the second image data; and
Max_row_number shows the total number of rows.

4. The camera as claimed in claim 1, wherein the image signal processor normalizes the first and second differentiated image data based on the following formula:

$$y[j]=\text{Max}\{B'[i,j],\ i=1\text{~Max\_row\_number}\},$$

where:
y[j] represents the oscillation amplitude of a jth column of the first/second differentiated image data;
B'[i, j] represents pixel data of an ith row and the jth column of the second differentiated image data; and
Max_row_number shows the total number of rows.

5. The camera as claimed in claim 1, wherein the image signal processor eliminates the flicker of background illumination according to the following formula:

$$S[i,j]=\{(A[i,j]+B[i,j])-(B'[i,j]-A'[i,j])\cdot x[j]/y[j]\}/2,$$

where:
S[i, j] represents pixel data of an ith row and a jth column of the flicker-eliminated image data;
A[i, j] represents pixel data of an ith row and a jth column of the first image data;
B[i, j] represents pixel data of an ith row and a jth column of the second image data;
A'[i, j] represents pixel data of an ith row and a jth column of the first differentiated image data;
B'[i, j] represents pixel data of an ith row and a jth column of the second differentiated image data;
x[j] represents the oscillation amplitude of the jth column of the first/second image data; and
y[j] represents the oscillation amplitude of the jth column of the first/second differentiated image data.

6. The camera as claimed in claim 1, wherein the camera sensor further captures third and fourth image data which are separated by the time delay, and, the image signal processor obtains subsequent flicker-eliminated image data from the third and fourth image data.

7. The camera as claimed in claim 6, wherein the camera sensor starts the exposure process for capturing the third image data when the second image data has been completely read out by the image signal processor.

8. The camera as claimed in claim 1, wherein the camera sensor further captures third image data later than the second image data by the time delay, and, the image signal processor obtains subsequent flicker-eliminated image data from the second and third image data.

9. An image capturing method with anti-flicker capability, comprising:
   capturing first and second image data which are separated by a time delay, wherein the time delay depends on a flicker period of background illumination;
   differentiating the first and the second image data along rows to obtain first and second differentiated image data, respectively;
   normalizing the first and second image data and thereby obtaining for each column an oscillation amplitude;
   normalizing the first and second differentiated image data and thereby obtaining for each column an oscillation amplitude; and
   eliminating flicker of background illumination to obtain flicker-eliminated image data based on the first and second image data, the first and second differentiated image data, and the oscillation amplitudes obtained from normalizing the first and second image data and the oscillation amplitudes obtained from normalizing the first and second differentiated image data.

10. The method as claimed in claim 9, wherein the time delay is half the flicker period of the background illumination.

11. The method as claimed in claim 9, wherein the normalizing step for the first and second image data is based on the following formula:

$$x[j] = \text{Max}\{A[i,j] - B[i,j], i=1 \sim \text{Max\_row\_number}\},$$
and where:
   x[j] represents the oscillation amplitude of a jth column of the first/second image data;
   A[i, j] represents pixel data of an ith row and the jth column of the first image data;
   B[i, j] represents pixel data of an ith row and the jth column of the second image data; and
   Max_row_number shows a total number of rows.

12. The method as claimed in claim 9, wherein the normalizing step for the first and second differentiated image data is based on the following formula:

$$y[j] = \text{Max}\{B'[i,j], i=1 \sim \text{Max\_row\_number}\},$$

where:
   y[j] represents the oscillation amplitude of a jth column of the first/second differentiated image data;
   B' [i, j] represents pixel data of an ith row and the jth column of the second differentiated image data; and
   Max_row_number shows a total number of rows.

13. The method as claimed in claim 9, wherein step of eliminating the flicker of the background illumination is based on the following formula:

$$S[i,j] = \{(A[i,j]+B[i,j]) - (B'[i,j] - A'[i,j]) \cdot x[j]/y[j]\}/2,$$

where:
   S[i, j] represents pixel data of an ith row and a jth column of the flicker-eliminated image data;
   A[i, j] represents pixel data of an ith row and a jth column of the first image data;
   B[i, j] represents pixel data of an ith row and a jth column of the second image data;
   A'[i, j] represents pixel data of an ith row and a jth column of the first differentiated image data;
   B'[i, j] represents pixel data of an ith row and a jth column of the second differentiated image data;
   x[j] represents the oscillation amplitude of the jth column of the first/second image data; and
   y[j] represents the oscillation amplitude of the jth column of the first/second differentiated image data.

14. The method as claimed in claim 9, further comprising:
   capturing third and fourth image data which are separated by the time delay; and
   obtaining subsequent flicker-eliminated image data from the third and fourth image data.

15. The method as claimed in claim 14, further controlling a camera sensor to start the exposure process for capturing the third image data when the second image data has been completely read out from the camera sensor.

16. The method as claimed in claim 9, further comprising:
   capturing third image data later than the second image data by the time delay; and
   obtaining subsequent flicker-eliminated image data from the second and third image data.

* * * * *